United States Patent [19]

Ichise

[11] 4,286,350
[45] Sep. 1, 1981

[54] WINDSCREEN WIPER BLADE

[75] Inventor: Yoshiju Ichise, Urawa, Japan

[73] Assignee: Nippon Wiper Blade Co., Ltd., Saitama, Japan

[21] Appl. No.: 99,027

[22] Filed: Nov. 30, 1979

[30] Foreign Application Priority Data

Nov. 30, 1978 [JP] Japan .......................... 53-165246[U]
Apr. 4, 1979 [JP] Japan ............................ 54-44259[U]

[51] Int. Cl.³ .............................................. B60S 1/40
[52] U.S. Cl. ................................ 15/250.32; 15/250.42
[58] Field of Search ............ 15/250.32, 250.35–250.42

[56] References Cited

U.S. PATENT DOCUMENTS

| 3,174,173 | 3/1965 | Phillips et al. | 15/250.42 |
| 3,843,994 | 10/1974 | Smithers | 15/250.32 |

FOREIGN PATENT DOCUMENTS

| 44399 | 7/1956 | Fed. Rep. of Germany | 15/250.32 |
| 2232202 | 12/1974 | France | 15/250.42 |

Primary Examiner—Peter Feldman
Attorney, Agent, or Firm—Wenderoth, Lind & Ponack

[57] ABSTRACT

A windscreen wiper blade assembly including a rubber element, a backing strip connected to the rubber element, a pair of yokes with one ends thereof being connected to the end portions of the rubber element, and a connecting means including connecting pin connecting the yokes with one another. A surface portion is defined on each of the yokes intermediate its opposite ends, and which extends generally along the longitudinal center plane of the rubber element such that the surface portions are adjacent to and face one another. The connecting pin extends perpendicular to the surface portions of the yokes.

8 Claims, 8 Drawing Figures

WINDSCREEN WIPER BLADE

BACKGROUND OF THE INVENTION

This invention is related to windscreen wiper blade assemblies especially but not solely for motor vehicles.

Various types of windscreen wiper blade assemblies have been proposed and utilized, however, there are shortcomings such that due to the number of parts, the construction is complicated, thus increasing the manufacturing costs or the like.

SUMMARY OF THE INVENTION

An object of the present invention is to make windscreen wiper blade assemblies simpler in the construction whereby less parts are required.

According to this invention, a windscreen wiper blade assembling includes a rubber element, a backing strip connected to the rubber element, a pair of yokes with the opposite ends of the respective yokes being respectively connected to opposite ends of the rubber element through the backing strip, and a connecting pin means for pivotally connecting the yokes with one another. Each of the yokes includes, intermediate the opposite ends, a surface portion extending generally along the longitudinal central plane of the rubber element, and the connecting pin extends perpendicular to the surface portions of the yokes which are located adjacent and facing one another.

The yokes can be formed such that they have identical configurations thus reducing the number of parts and manufacturing costs.

Preferably, the yokes are made of synthetic resin material, thus substantially reducing the manufacturing costs and reducing the weight of the wiper blade assembly.

According to one feature of the present invention, the connecting pin means consists of a pair of spaced parallel pin elements respectively pivotally connected to the respective yokes.

BRIEF DESCRIPTION OF THE DRAWINGS

The preferred and other embodiments of the wiper blade assembly according to the invention will now be described by way of example with reference to the accompanying drawings in which.

DETAILED DESCRIPTION OF THE PREFERRED EMBODIMENT

Figure 1:
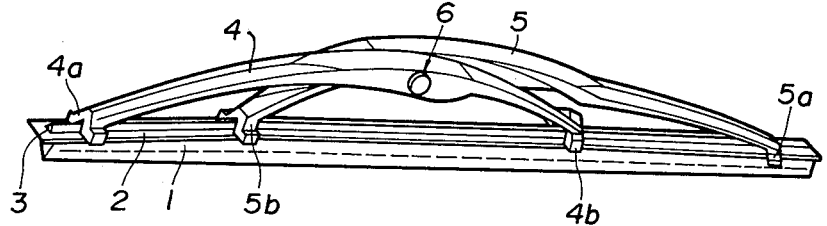
FIG. 1 is a perspective view of a wiper blade assembly according to the invention.
Figure 2:
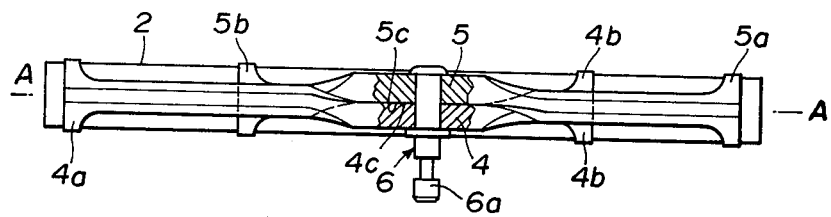
FIG. 2 is a cut away sectional plan view of the wiper blade assembly of FIG. 1.

The wiper blade assembly illustrated in FIGS. 1 and 2 comprises a rubber element 1, a backing strip 2 received in longitudinal grooves formed in the opposite sides of the rubber elements 1, a clip 3, a pair of yokes 4 and 5, and a connecting pin 6. The yokes 4 and 5 comprise respectively claws 4a and 4b, and 5a and 5b on the respectives yoke ends for connecting the yokes 4 and 5 to the backing strip 2. The yokes 4 and 5 are, the respective ends, pivotally connected with each other by a pivot pin 6. As clearly shown in FIG. 2 the levers or yokes 4 and 5 are formed such that two respective surface portions 4c and 5c thereof are adjacent to and face one another, according to one of the essential feature 4c and 5c, according to one of the essential features of the present invention. The surface portions 4c and 5c extend generally along the longitudinal central plane AA of the rubber element 1 and, in the embodiment slidingly contact one another in the assembled condition. The pivot pin 6 extends perpendicular to the surface portions 4c and 5c, and one end 6a of the pin 6 extends outwardly from the yoke 4 for releasably connecting thereto a wiper arm (not shown).

The yokes 4 and 5 can have an identical configuration and, preferably, are formed of synthetic resin material. Thus, it is possible to minimize the manufacturing and assembling costs and to reduce the weight of the wiper blade assembly.

Figure 3:
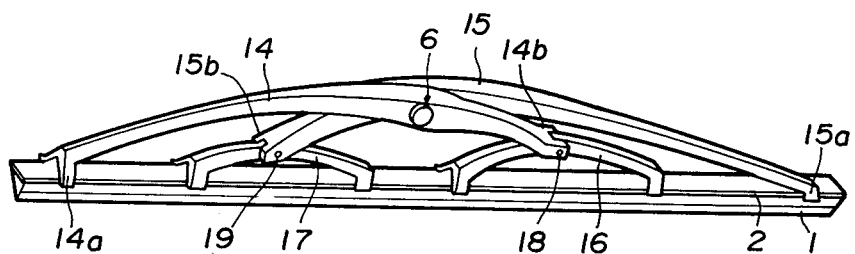
FIG. 3 is a perspective view of a second embodiment of the present invention.
Figure 4:
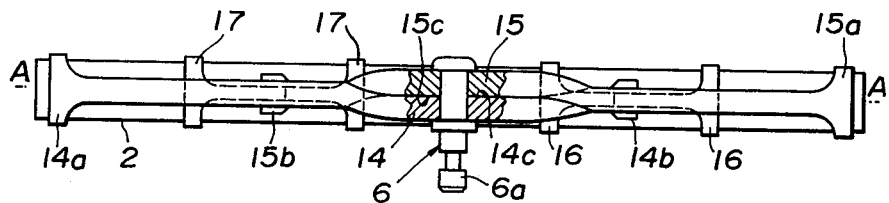
FIG. 4 is a cut away sectional plan view of the wiper blade assembly of FIG. 3.

The windscreen wiper blade assembly shown in FIGS. 3 and 4 is generally similar to the first embodiment and corresponding parts are depicted by the same numerals.

Respective yokes 14 and 15 have respective claws 14a and 15a positioned on their one end which are connected directly to the backing strip 2. The other respective ends 14b and 15b of the yokes 4 and 5 are bifurcated, and the central portions of respective sub-yokes 16 and 17 are pivotally mounted on the bifurcated ends 14b and 15b through pivot pins 18 and 19. The sub-yokes 16 and 17 have claws on opposite ends for connecting the sub-yokes to the backing strip 2. Similar to the first embodiment, the intermediate portions of respective yokes are formed such that two respective surface portions 14 and 15 are adjacent to and face one another (the vertical direction as viewed in FIG. 4).

Figure 5:
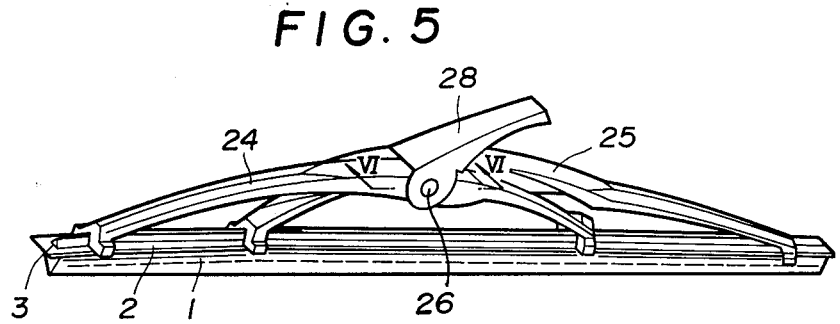
FIG. 5 is a perspective view of a third embodiment of the present invention.
Figure 6:
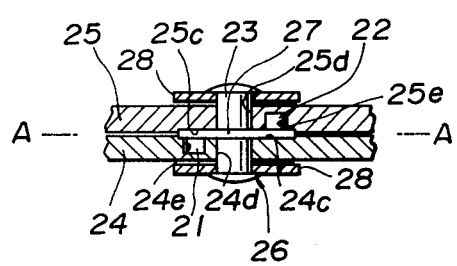
FIG. 6 is an enlarged sectional view taken along line VI—VI in FIG. 5.
Figure 7:
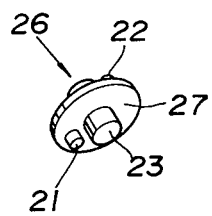
FIG. 7 is a perspective view of the connecting pin means of FIG. 6.

The windscreen wiper blade assembly shown in FIGS. 5-7 differs from the first embodiment in that the pivot pin 6 in the first embodiment is replaced by a connecting means or connector 26 and a bayonet clip is pivotally mounted on the connector 26 for releasably connecting a wiper arm which is not shown in the drawings.

As shown in FIG. 7, the connector 26 is an integral member consisting of a pin 23, a disc 27 secured to the central portion of the pin portion 23, and a pair of pin elements 21 and 22 secured to the disc 27 and extending in the opposite directions. The yokes 24 and 25 are, similar to the yokes 4 and 5 in the first embodiment, formed such that two respective surface portions 24c and 25c are adjacent to and face one another, according to the invention. The surface portions 24c and 25c are defined as recesses for receiving therebetween the disc 27 of the connector 26 when in the assembled condition as shown in FIG. 6. The pin 23 of the connector 26 is snugly received in openings 24d and 25d of the yokes 24 and 25 to pivotally connecting the yokes with each other. The pin elements 21 and 22 are respectively received in recesses 24e and 25e formed in the surface portions 24c and 25c of the yokes respectively. The recesses 24e and 25e are elongated in the direction of the pivotal movement of the yokes 24 and 25 radially spaced from the pin 23 by a predetermined amount, thus, the recesses 24e and 25e cooperate respectively with the pin elements 21 and 22 to act as stops restricting the pivotal movement of the yokes 24 and 25.

Figure 8:
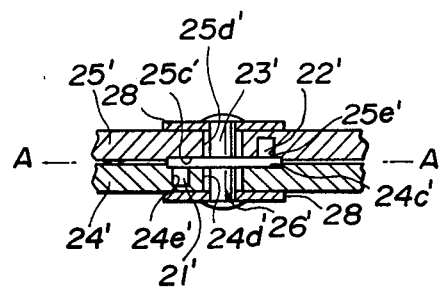
FIG. 8 is a view similar to FIG. 6 but showing a modified form of that embodiment

FIG. 8 is generally similar to the FIG. 6, however, the construction and function of the embodiment of FIG. 8 differ from the embodiment of FIG. 6. The pin element 21' of the connector 26' is pivotally received in an opening 24'e of the yoke 24', and the pin element 22' of the connector 26' is pivotally received in an opening 25e' of the yoke 25'. The pin portion 23' is loosely received in respective openings 24d' and 25d' of the yokes 24' and 25', and is pivotally connected to bayonet clamp 28. The configuration of the openings 24d' and 25d' and the diameter of the pin portion 23' are determined such that the relative movement therebetween the yokes is restricted. The yokes 24' and 25' and the bayonet clip 28 to which a wiper arm (not shown) is connected can articulate independently by a predetermined and substantial amount. More particularly, the yokes 24' and 25' can assume an angle relative to each other, thus the rubber element 1 can exactly follow the shape of the windscreen even when the curvature thereof between the opposite end portions of the rubber elements differs substantially.

Although the construction of some parts, e.g., the rubber element 1, the backing strip 2, the pin 6 or the like has not been described in detail, those skilled in the art can easily apply the features of present invention to various forms of windscreen wiper blade assemblies.

What is claimed is:

1. A windscreen wiper blade assembly comprising:
   a rubber element for wiping a windscreen;
   a backing strip connected to said rubber element;
   a pair of yokes, said yokes having opposite ends, one end of one yoke being connected to one end of said backing strip and the opposite end of the other yoke being connected to the other end of the backing strip thereby attaching said yokes to said rubber element;
   each one of said yokes having a surface portion defined intermediate said opposite ends such that the surface portions face one another;
   each surface portion having a corresponding bore therethrough; and
   a connecting means having a connecting pin which slidably engages the inner periphery of each of the corresponding bores for pivotably connecting said yokes and allowing for relative rotational movement of said yokes and pin elements integrally connected to said connecting pin and respectively engaging said yokes for restricting relative rotational movement of said yokes.

2. A windscreen wiper blade assembly as claimed in claim 1 wherein said yokes are substantially structurally identical with one another.

3. A windscreen wiper blade assembly as claimed in claim 1 wherein said connecting pin is a pivot pin.

4. A windscreen wiper blade assembly as claimed in claim 3, wherein a bayonet clip for releasably connecting thereto a wiper arm is mounted on the opposite ends of the connecting pin.

5. A windscreen wiper blade assembly as claimed in claim 1 wherein the other ends of said yokes are respectively connected to opposite ends of said backing strip.

6. A windscreen wiper blade assembly as claimed in claim 1 further comprising:
   sub-yokes being pivotably connected to the other ends of said yokes; and
   said sub-yokes being respectively connected to the opposite ends of said backing strip.

7. A windscreen wiper blade assembly as claimed in claim 1 in which:
   said surface portion of each of said yokes has an elongated recess in which one of said pin elements slidably engages whereby when said yokes exhibit substantial relative rotational movement, said pin elements abut the side edges of a respective one of said elongated recess and thereby restrict relative rotational movement of said yokes.

8. A windscreen wiper blade assembly as claimed in claim 1 in which:
   said connecting pin has an integral collar positioned intermediate said yokes; and
   said pin elements are connected to said collar, and extend parallel to and are radially spaced from said connecting pin.

* * * * *